United States Patent
Clauss et al.

(10) Patent No.: US 7,053,599 B2
(45) Date of Patent: May 30, 2006

(54) METHOD AND MEASURING DEVICE FOR LOCATING ENCLOSED OBJECTS

(75) Inventors: Stefan Clauss, Leinfelden-Echterdingen (DE); Uwe Skultety-Betz, Leinfelden-Echterdingen (DE); Bjoern Haase, Stuttgart (DE); Ulli Hoffmann, Nieffern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/492,441

(22) PCT Filed: Feb. 7, 2003

(86) PCT No.: PCT/DE03/00354

§ 371 (c)(1),
(2), (4) Date: Apr. 13, 2004

(87) PCT Pub. No.: WO03/073132

PCT Pub. Date: Sep. 4, 2003

(65) Prior Publication Data

US 2004/0201370 A1 Oct. 14, 2004

(30) Foreign Application Priority Data

Feb. 21, 2002 (DE) ................. 102 07 426

(51) Int. Cl.
*G01R 19/00* (2006.01)

(52) U.S. Cl. ............................................. 324/67

(58) Field of Classification Search ........... 324/662, 324/663, 665, 671, 672, 67

See application file for complete search history.

(56) References Cited

U.S. PATENT DOCUMENTS

| | | | | |
|---|---|---|---|---|
| 5,012,683 A | * | 5/1991 | Davis | 73/864.24 |
| 6,198,271 B1 | | 3/2001 | Heger et al. | 324/67 |
| 6,211,662 B1 | * | 4/2001 | Bijawat et al. | 324/67 |
| 6,249,113 B1 | | 6/2001 | Krantz et al. | 324/67 |
| 6,838,887 B1 | * | 1/2005 | Denen et al. | 324/686 |
| 2003/0021078 A1 | * | 1/2003 | van Berkel | 361/234 |

FOREIGN PATENT DOCUMENTS

| | | |
|---|---|---|
| EP | 0 438 159 A | 7/1991 |
| SU | 563 494 A | 6/1977 |
| WO | 94 04932 A | 3/1994 |
| WO | 98 30921 A | 7/1998 |

\* cited by examiner

*Primary Examiner*—Anjan Deb
*Assistant Examiner*—John Teresinski
(74) *Attorney, Agent, or Firm*—Michael J. Striker

(57) ABSTRACT

A method for locating objects enclosed in a medium, according to which a detection signal is generated by at least one capacitive sensor device, the detection signal penetrating the medium that is to be analyzed in such a way that information is obtained about the objects that are enclosed in the medium by evaluating the detection signal, particularly by measuring impedance, wherein, in order to obtain information about the depth of an object that is enclosed in the medium, a phase measurement of a variable which is correlated with a shift current of the capacitive sensor device is utilized.

10 Claims, 5 Drawing Sheets

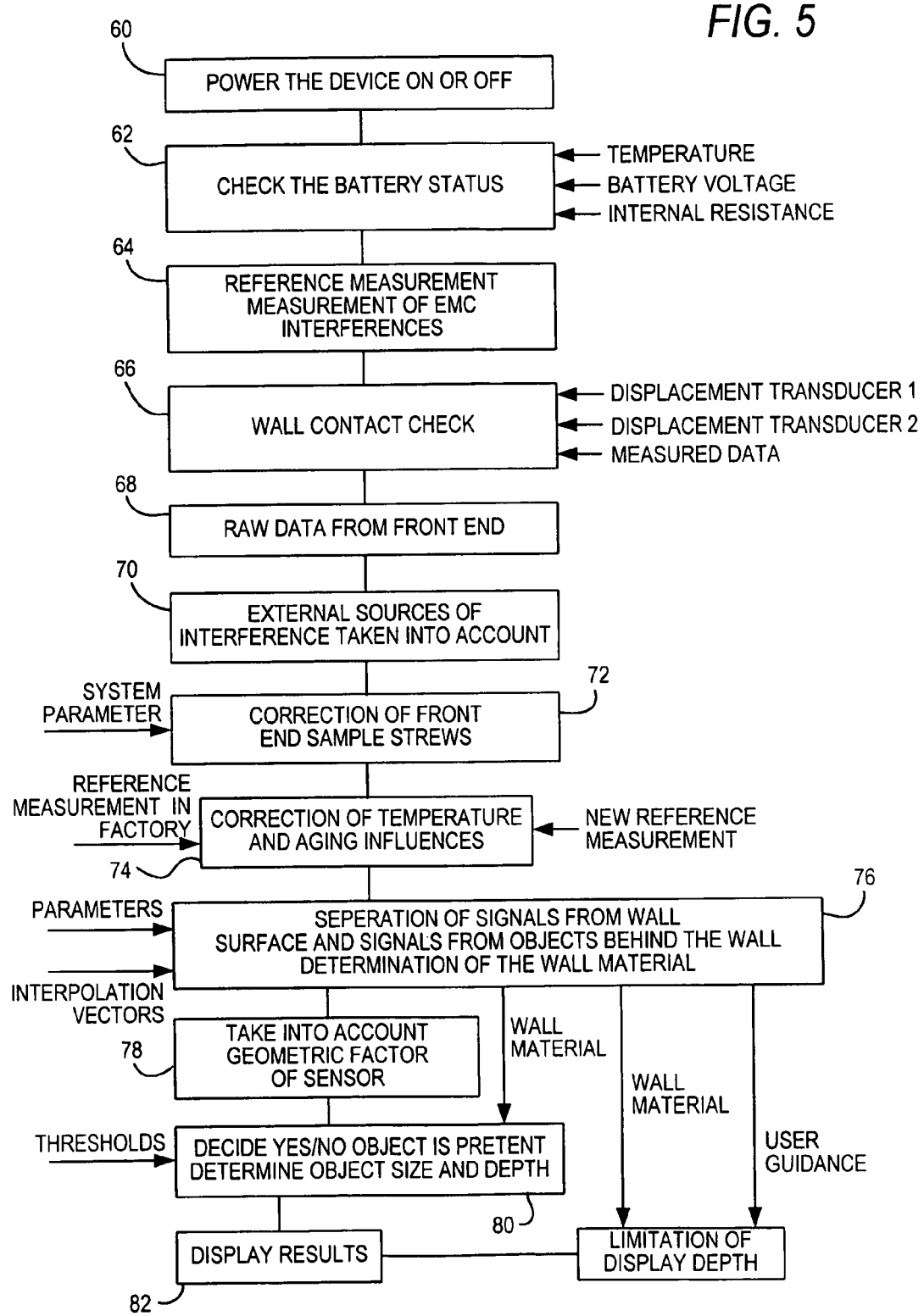

METHOD AND MEASURING DEVICE FOR LOCATING ENCLOSED OBJECTS

CROSS-REFERENCE TO A RELATED APPLICATION

Patent application Ser. Nos. 10/500,589 and 10/491,087 disclose a similar subject matter.

BACKGROUND INFORMATION

The present invention relates to a method and/or a measuring device for locating objects enclosed in a medium according to the preamble of Claim 1 and/or Claim 8.

A method of this nature, and/or a measuring device for carrying out this method utilizes a capacitive sensor device that generates a detection signal, e.g., in the form of an electromagnetic field, so that the detection signal passes through the medium to be analyzed, but, at the very least, penetrates the medium to a sufficient extent. An object enclosed in the medium influences the detection signal, so that an evaluation of the detection signal makes it possible to obtain information about an object that is enclosed in the medium.

A measuring device according to the general class, e.g., a stud sensor, detects an object that is enclosed in the medium by way of the change of the electrical capacitance of its capacitive sensor device, the change being generated by the enclosed object. An object that is enclosed in a medium changes the dielectric properties of the medium, so that a precision capacitor that is brought into the vicinity of the object senses a change in capacitance caused by the object and/or a change in its impedance. This capacitance change may be measured, for example, by the shift current of the precision capacitor of the capacitive sensor device.

A compact, hand-held stud sensor is made known in U.S. Pat. No. 6,249,113 B1. To locate objects behind a surface, the stud sensor measures the change in capacitance sensed by a sensor circuitry as the measuring device is moved across a wall. To display the exact location of an object enclosed in the medium, the measuring device according to U.S. Pat. No. 6,249,113 B1 comprises an LED array in an arrow-shaped format on the housing of the measuring device. When an object is detected by the measuring device, a pair of LEDs in the arrow-shaped LED array on the housing of the measuring device is activated as a function of the signal strength. As the sensor is scanned closer to the enclosed object, i.e., the stronger the detection signal that is generated by the object becomes, the further the activated LEDs travel toward the arrow tip in the LED array. When the measuring device is finally positioned directly over the enclosed object, the tip of the arrow in the LED array is illuminated. Basically, therefore, the measuring device according to U.S. Pat. No. 6,249,113 B1 makes it possible to locate objects enclosed in a medium, e.g., a wall. Neither the device disclosed in U.S. Pat. No. 6,249,113 B1 for locating objects enclosed in a medium, nor the very simple method on which it is based, are capable of measuring the depth at which the object is located.

Publication WO 94/04932 discloses a portable device for locating objects positioned behind a surface, comprising a sensor for sensing additional capacitive loading caused by the object, an evaluation unit for the detection signal, and a display for presenting the measured results. In addition, the measuring device according to WO 94/04932 comprises a device that allows the sensor device to be operated in a higher-sensitivity or lower-sensitivity mode.

Publication WO 94/04932 further discloses a method for determining the location of an object positioned behind a surface. To accomplish this, the corresponding measuring device is moved across the wall to be analyzed. The sensor according to WO 94/04932 is capable of sensing an increase or decrease in the thickness of the material. This permits the device to inform the operator, for example, that the sensor was calibrated incorrectly, e.g., directly over an enclosed object. The method on which this is based further makes it possible to inform the operator that the medium being analyzed is too thick or too thin for an enclosed object to be detected.

A digital register in the measuring device according to WO 94/04932 permits the calibration data to be stored indefinitely while the sensor is powered on.

A stud sensor is made known in U.S. Pat. No. 6,198,271 B1, which, in order to locate objects enclosed in a wall, detects the changes in capacitance of three capacitive sensors as the sensor is moved across the wall, the sensors being integrated in the measuring device. A comparison circuit monitors the relative charge time associated with each capacitive element, the charge times providing an indication of the relative capacitances of the three capacitive elements. Changes in the relative capacitances of the three elements as the device is moved along a wall are due to a change in the dielectric constant of the wall, which normally results from the presence of an object behind the surface over which the device is moved. The comparison circuit uses differences in the measured relative capacitances of the individual capacitive elements to locate the enclosed object.

The measuring device disclosed in U.S. Pat. No. 6,198,271 B1 includes a display that consists of a plurality of display elements that are connected with the evaluation unit of the measuring device in such a manner that only those elements that are located directly above the located object display a signal. In this manner, it is possible to center the measuring device over the located object and thereby indirectly determine the location of the object.

ADVANTAGES OF THE INVENTION

The inventive method for locating objects enclosed in a medium utilizes a detection signal that is generated by a capacitive sensor device, the detection signal penetrating the medium to be analyzed and being influenced by an object located in the medium. By evaluating the detection signal generated when an enclosed object is present in comparison with a detection signal that would be generated if an object were not present, information about objects enclosed in the medium may be obtained. To detect the enclosed object, the inventive method utilizes the change in capacitance of a capacitive sensor device that results from the change in the dielectric constants of the measured medium, the change being caused by the enclosed object. The change in the dielectric constants may be determined by measuring the impedance between the electrodes of the capacitive sensor device.

According to the invention, the proposed method provides that, to obtain information about the depth of the object enclosed in the medium, a phase measurement is utilized, particularly a phase measurement of a variable which is correlated with a shift current of the capacitive sensor device.

If a voltage is applied between the electrodes of the capacitive sensor device, a stray electric field is produced that extends in an area beyond the electrodes and can therefore engage in an object to be analyzed. In advantageous fashion, a desired directional pattern may also be imposed on a field of this nature. If alternating voltage, in particular, is applied between the electrodes of the sensor device, a shift current flows between the electrodes, along the electrical flux lines that connect the two electrodes. When the voltage is fixed, the shift current increases as the impedance of the precision capacitor decreases and the greater its capacitance becomes. If an object is located in the area of the flux lines, the impedance between the sensor electrodes changes and, therefore, the shift current changes. If one now measures not only the magnitude of shift current but its phase as well, it is possible to not only determine the location of an enclosed object on the surface of the enclosing medium, but to also obtain information about the depth of the object behind the surface of the medium.

Using the inventive method it is also possible to make a distinction between objects that are dielectrically "denser" (e.g., copper wire) than the enclosing medium, and objects having lower dielectric constants ∈ than the enclosing medium (e.g., plastic pipe). In the first case, the shift currents are strengthened by the enclosed object, and they become weaker in the second case. This therefore results in a phase position that is altered by 180°, thereby enabling unequivocal identification of objects in terms of the magnitude of their dielectric constants.

Advantageous improvements and further developments of the method indicated in Claim 1 are possible due to the measures listed in the further claims.

The change in shift current and/or the change in capacitance of the sensor device induced by the presence of an enclosed object may be measured using the most diverse types of electronic circuitry. In the inventive method, the shift current is advantageously not selected to evaluate the detection signal directly. Instead, a measurement parameter that has a linear relationship with the shift current of the capacitive sensor device is advantageously selected. Due to the fact that a measurement parameter M and not the shift current itself is measured, it is possible to calculate, based on the measured signal, interferences in the measured signal that result, e.g., from crosstalk effects or phase distortions due to the frequency characteristic of the evaluation circuitry.

In principle, any electrical measurement parameter is suitable, which is linked in any form with the impedance of the sensor element. The change in the shift current, and/or the change in the capacitance of the sensor device may be measured using the most diverse types of electronic circuitry. For example, the natural frequency of an oscillating circuit may be measured, the oscillating circuit being composed of the precision capacitor and a coil that is connected with it in series or in parallel. After excitation by a brief electrical pulse, an oscillating circuit of this type performs a damped oscillation at its resonance frequency. The time-resolved measurement of this resonance therefore enables deductions to be made about the shift currents involved. In advantageous fashion, with the inventive method for the determination of changes in impedance induced by the presence of an enclosed object, an electrical voltage is measured within an evaluation circuitry for the detection signal. The magnitude and phases of these voltage values may be determined with high accuracy in simple fashion using a corresponding sampling circuit.

By using a detection signal that is composed of a plurality of frequencies, and/or by using a spectrally broad detection signal, the signal-to-noise ratio of the measurement may be improved, in particular. Moreover, by performing measurement and evaluation at more than one frequency, it is possible to distinguish the located, enclosed object in terms of its metallic-nonmetallic properties. When a plurality of measuring frequencies is used, it is also possible, as an alternative, to simultaneously detect a plurality of targets at different depths, even though their signals are superposed. If the measurement were performed solely at a single frequency in this case, the measured results would be adulterated. Moreover, a spectrally broad electrical pulse used as the excitation signal allows ambiguities in phase measurement to be avoided by comparing the measured results at various frequencies.

In order to also be able to detect the most minute changes in capacitance caused by small, enclosed objects and/or objects whose dielectric constants differ unsubstantially from the constants of the surrounding material, the inventive method provides that measuring frequencies be utilized that are typically in an interval of 100 MHz to 10,000 MHz. Advantageously, measuring frequencies are preferably utilized for the detection signal that are located in an interval between 1000 MHz and 5000 MHz. Optimal measuring frequencies for the inventive method and/or a measuring device that utilizes the method form frequencies that are typically in an interval between 1500 MHz and 3500 MHz.

The high frequencies themselves enable sufficiently large changes in the shift current in the presence of very small changes in capacitance caused by an enclosed object, so that such changes in capacitance and the objects that generate them can be measured with a correspondingly high level of sensitivity. On the other hand, high frequencies of this nature require measurement technology that is correspondingly complex. While phase displacement between current and voltage on the capacitive sensor element is 90° at low frequencies, deviations from this are observed at higher frequencies, due to inductive effects. In addition to the observed changes in the imaginary part of the impedance, significant ohmic portions in the impedance can also be observed at higher frequencies, depending on the damping of the dielectric material of the precision capacitor. The inductive interference effects may be eliminated in the case of the inventive method by not measuring the dielectric shift current of the capacitive sensor device directly, but by measuring a measurement parameter correlated in linear fashion with the shift current. The frequency-dependent constants, which establish the ratio of the dielectric shift current to the measurement parameter M measured in the inventive method, may be measured independently, resulting in two degrees of freedom for compensating for interference effects. The coefficients can therefore be determined by performing a reference measurement on defined impedances and making them available to the inventive method during evaluation.

In the case of the inventive method, the detection signal for locating an object enclosed in a medium is advantageously evaluated as a function of the lateral displacement of the capacitive sensor device—that generates the detection signal—on the surface of the enclosing medium. In this manner, it is possible to very accurately measure the location of the enclosed object, i.e., its lateral position in the enclosing medium, and a measurement of the sensor signals as a function of the lateral displacement of the sensor over the object allows the measurement accuracy to be increased further. Depending on the displacement of the sensor, another ensemble of flux lines of the electrical measurement field of the capacitive sensor device is influenced by the object. A characteristic dependence of the depth of the object and the lateral displacement on the phase position of the measured signal therefore results.

The spatially resolved measurement of the detection signal can also be utilized to better discriminate the background signal, which is generated solely by the enclosing medium.

Using a threshold sensor, which can also depend on the material of the enclosing medium, for example, a decision step may be advantageously implemented in the inventive method that determines whether an enclosed object is present or not.

Likewise, a measure of the size of the object may be determined via the drop in signal strength based on the movement of the capacitive sensor device, which is advantageously coupled with a path sensor, so that, with the inventive method, it is possible to determine the lateral position of the object in the medium, its depth relative to the surface of the medium, and indications of the size of the object.

The inventive method may be used in advantageous fashion for a capacitive sensor device of a measuring device that serves to locate objects enclosed in media. It is possible, in particular, using the method according to the invention, to obtain a compact, hand-held locating device that permits the detection of objects enclosed in walls, ceilings and/or floors, for example, with a high level of accuracy.

In addition to a corresponding capacitive sensor device and the means for generating and evaluating a detection signal of this sensor device, an inventive measuring device of this nature also advantageously includes an output device, e.g., a display, that permits the determined measured results, in particular the location and depth of an object enclosed in the medium, to be depicted in a spatially-resolved manner on the display of the measuring device. To this end, a measuring device of this nature is equipped with a control and evaluation unit that is connected with the sensor device and includes means that advantageously enable the spatially-resolved measured results to be depicted on the display of the measuring device directly in real time, i.e., while the measuring device is being moved across a wall.

The measuring device according to the invention and/or the inventive method on which it is based enable the operator to determine the exact location of an object enclosed in a medium, in all three dimensions of space. It is also possible with the inventive method to obtain information about the size of the enclosed object.

BRIEF DESCRIPTION OF THE DRAWINGS

An exemplary embodiment of the inventive method is presented in the drawing, and it is explained in greater detail in the description hereinbelow. The figures in the drawing, their description, and the claims directed to the inventive method and/or the measuring device that utilizes the method contain numerous features in combination. One skilled in the art will advantageously consider them individually as well and combine them into reasonable further combinations.

FIG. 5 is a block diagram for depicting the method steps in the inventive method.

DETAILED DESCRIPTION OF THE EMBODIMENTS

Figure 1:
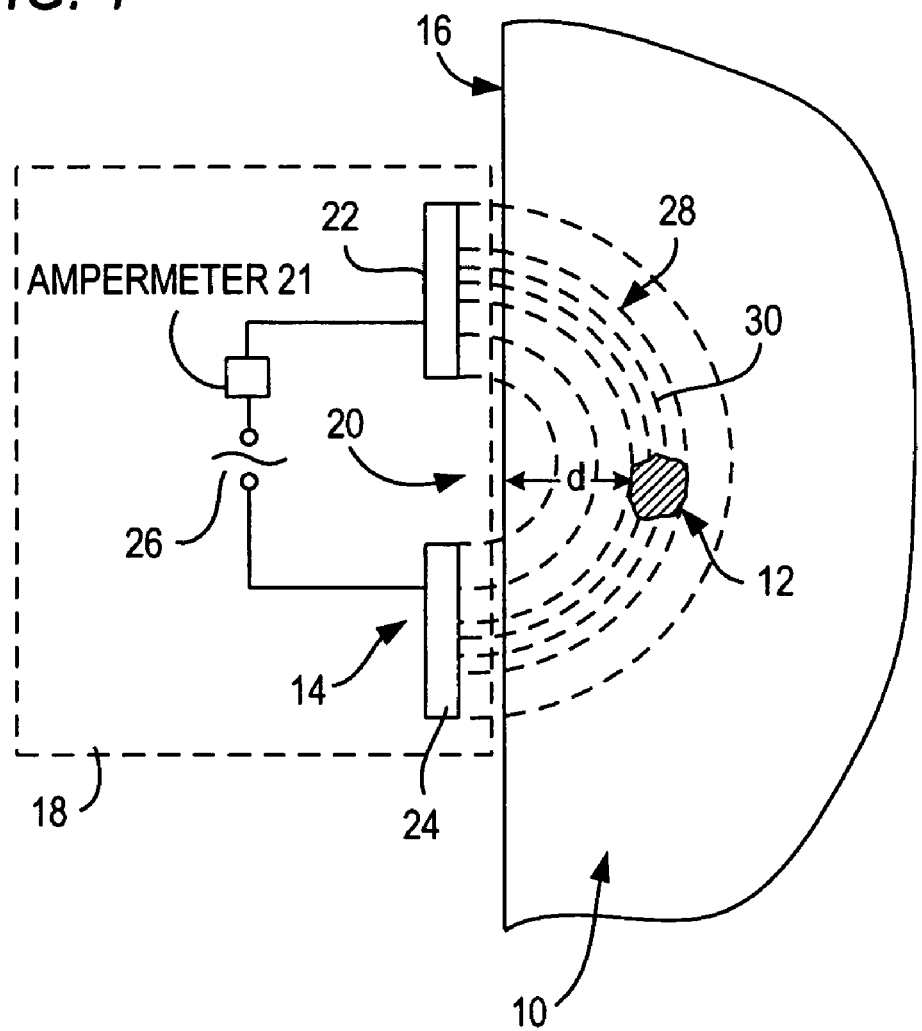
FIG. 1 is a schematic representation of the measurement situation on which the inventive method is based.

FIG. 1 is a schematic representation of a typical measurement situation for application of the inventive method and/or utilization of the measuring device. The objective is to detect an object 12 that is enclosed in a medium 10 using a capacitive sensor device 14. Enclosed object 12 is located at a distance d from a surface 16 of enclosing medium 10. A measuring device 18, which contains capacitive sensor 14, among other things, is placed on surface 16 of medium 10 that encloses object 12. Capacitive sensor device 14 is essentially composed of a precision capacitor 20, which includes two capacitor electrodes 22 and 24. Capacitor electrodes 22 and 24 are positioned side-by-side in FIG. 1 merely to graphically illustrate the measurement principle. In a real capacitive sensor device, the electrodes of a measurement capacitor will be positioned essentially parallel to each other. The desired directional effect of the electric field of measurement capacitor 20 is generated by corresponding electrodes or geometric means.

By applying an electrical voltage 26, an electric field 28 is generated between electrodes 22 and 24 of measurement capacitor 20 of measuring device 18. If an alternating voltage, in particular, is applied to the two electrodes of the measurement capacitor, a "shift current" flows along flux lines 30 that describe electric field 28. When voltage U is fixed, shift current I is greater the lower the impedance is, i.e., complex resistance Z of measurement capacitor 20. Shift current I can be measured directly using an ammeter 21, for example, or using a measurement parameter M correlated with the shift current, such as a voltage signal.

Impedance Z of measurement capacitor 20 is essentially determined by the material located between capacitor electrodes 22 and 24. If a measurement capacitor 20 of this type is now brought into the vicinity of an enclosed object 12, the composition of the material changes in the area covered by electric field 28.

In particular, the presence of an enclosed object 12 results in a changed dielectric constant $\in$ and, therefore, changed impedance Z in comparison with a medium 10 in which an enclosed object 12 is not present.

The change in dielectric constants induced by the presence of enclosed object 12 and the associated change in impedance Z of the measurement capacitor corresponds to changed capacitance C of the measurement capacitor.

The increase in capacitance C of measurement capacitor 20 and/or the resultant increase in shift current I between capacitor electrodes is depicted in FIG. 1 using an increased density of flux lines in the illustration of electric field 28 in the flux line illustration.

When a material having a greater dielectric constant $\in$ than the corresponding constants of surrounding medium 10 enters field area 28 generated by capacitive sensor 14, the flux lines become denser. If an object has lower dielectric constants than the surrounding material, the flux line density lowers in the area of the enclosed object.

The change in capacitance caused by the presence of an enclosed object and/or the change in shift current in the capacitive sensor may be measured and evaluated using various electronic circuits.

For example, the natural frequency of an oscillating circuit that forms can be utilized by the measurement capacitor and at least one coil connected with it in series or in parallel. After excitation by a brief electrical pulse, an oscillating circuit of this type performs a damped oscillation at its resonance frequency. A time-resolved measurement of the resonance therefore enables deductions to be made about the capacitances involved and, therefore, the shift current.

As an alternative, the shift current may be measured directly by the measurement capacitor when a constant alternating voltage having a fixed frequency is applied.

In the inventive method, electrical shift current I of capacitive sensor device 14 is not measured directly. Instead, to evaluate the detection signal, a frequency-dependent measurement parameter M is measured, which has a nearly linear relationship with the shift current of the capacitive sensor device. With the inventive method, an electrical voltage correlated with the shift current, in particular, is measured as measurement parameter M. That is, the following applies for measurement parameter M that is utilized:

$$M=M(\omega)=\alpha(\omega)+\beta(\omega)*I(\omega)$$

Complex measurement parameter $M(\omega)$ is evaluated in linear approximation of shift current $I(\omega)$ of the measurement capacitor. In this process, $\alpha(\omega)$ describes an internal crosstalk of the capacitor electrodes, and $\beta(\omega)$ takes into account the frequency characteristic and phase distortions on the electrical lines inside the evaluation circuitry and the matching network of the capacitive sensor device.

$\alpha(\omega)$ and $\beta(\omega)$ are frequency-dependent constants that are capable of being measured independently. They can be determined very exactly by performing a reference measurement of defined impedances, for example, so that, by measuring M, the shift current is also measured.

Figure 2:
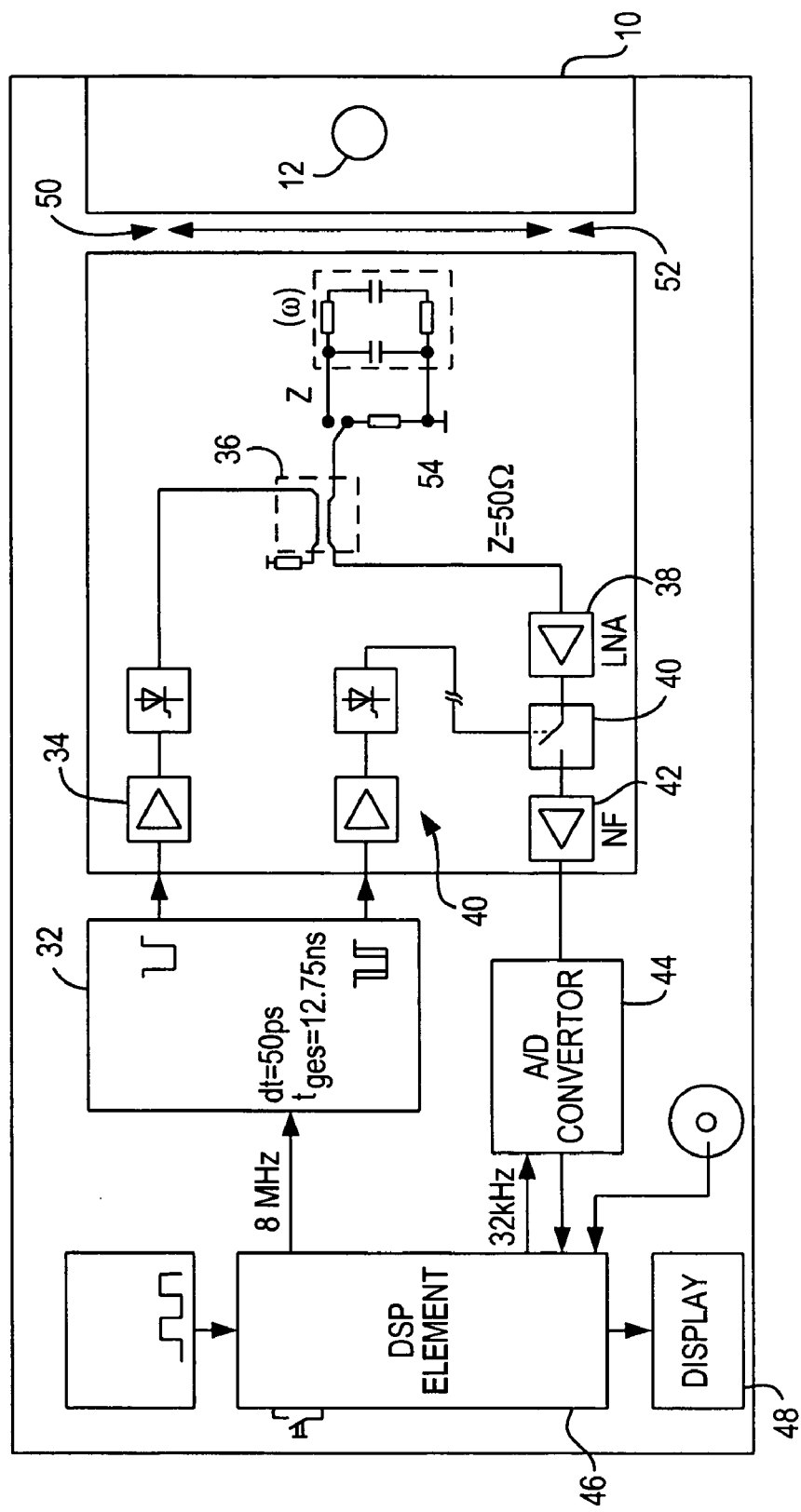
FIG. 2 is a block diagram for measuring impedance according to the inventive method.

FIG. 2 shows an exemplary embodiment of an evaluation circuit that can be utilized within the framework of the inventive method. A pulse generator 34 controlled by a time base 32 generates a chronologically short, spectrally broad voltage pulse that can be supplied to capacitive sensor device 14 via a wave coupler 36. The capacitance of measurement capacitor 20 and, therefore, impedance Z of the sensor are a function of the dielectric medium that penetrates the electric field of the capacitor electrodes.

If the capacitive sensor device is brought into the vicinity of an object 12, distortions of the electric field occur due to the changed dielectric constants of the capacitor field. Impedance Z is changed as a result, and it is capable of being measured via the shift current and/or derived measurement parameter $M(\omega)$. The impedance of the capacitive sensor is coupled out once more as a time-dependent voltage signal U(t) by directional coupler 36, then it is amplified and forwarded to a sampling unit 40, in which the magnitude and phase of the measured signal are determined. This will be described in greater detail hereinbelow.

At the point at which measurement sensor 14 is connected to the match-terminated line, voltages coupled in by the generator via wave coupler 36 are reflected in more or less pronounced fashion. The amplitude and phase of the signal reflected at this point is a reflection of the difference of impedance Z of sensor 14 and line impedance; it makes it possible to deduce the magnitude and phase of the impedance of sensor 14 and, therefore to determine the magnitude and phase of the current flow through sensor 14.

The determination of the magnitude and phase of current flow through sensor capacitor 14 can therefore be traced back to the determination of magnitude and phase of voltage U reflected at the connection point of sensor 14.

The signals reflected at the connection point pass back through the wave coupler. The signals induced in the transmitting branch via crosstalk in wave coupler 36 are negligible in comparison with the signal portions passing back directly in the direction of the detecting branch. Voltage V that exists at the entry of the detection circuit is a reflection of voltage U that is reflected at the connection point of sensor 14, except for the minimal losses at wave coupler 36 and the time-of-arrival difference.

The voltage (which is usually low) that results after wave coupler 36 is advantageously amplified first in a high-frequency amplifier 38 in the detecting branch. The voltage is then sampled at defined points in time T. The points in time at which the voltage is measured is established by a sampling pulse. In order to enable a determination of the phase of the reflected voltage relative to the phase of the voltage produced by the generator, it is important that the generator of the transmit signal and the generator of the sampling pulse be coupled in a phase-locked manner. This is ensured by the use of the time base.

The voltage portions that exist at sampler at frequency f, namely $$V(f)=v(f)*\exp(i\phi(f))$$

therefore correlate with voltage W(T) measured after the sampler according to the equation $$W(T)=Re(\exp(I*2\pi*f*T)*V(f))$$

A shift in the point in time T at which sampling takes place therefore allows the magnitude and phase of voltage V at frequency f to be deduced.

Voltage W is advantageously processed first in a low-frequency amplifier so it can then be detected in an analog-digital converter. By measuring voltage W at various points in time T, it is therefore possible to determine amplitude as well as the phase of the reflected voltage portions and thereby deduce the magnitude and phase of the currents flowing in the sensor.

The measured signal is forwarded to a digital signal processor 46 in addition to analog-digital converter 44.

DSP element 46 performs further signal processing and control of the time base to generate the excitation pulse and the sampling pulse. DSP element 46 makes it possible for the evaluated measured values, i.e., the depth of objects enclosed in the wall, in particular, and their lateral position relative to the measurement sensor, to be depicted in a display in real time, i.e., during the measurement procedure itself. In this manner, it is possible with the inventive method to show the operator in a display where and at what depth in the wall objects are enclosed, even while the device is still being moved across a wall, for instance.

To determine lateral position, the capacitive measuring device can be moved across the medium to be analyzed in two opposite directions 50 and 52. A corresponding path sensor that forwards the current position of the capacitive sensor device to the digital signal processor permits the correct depiction of the depth and lateral position of the object.

For the inventive method, it is provided that, for calibration purposes, a defined reference impedance 54 can be measured instead of measurement capacitor 20. To this end, the electrical circuit for generating and evaluating the detection signal has switching means for generating and evaluating the detection signal, the switching means being depicted in the exemplary embodiment in FIG. 2 as symbolic switch 56. The switching means permit the excitation pulse to be forwarded not to measurement capacitor 20, but to reference impedance 54 instead. This defined reference impedance 54 can be generated, for example, by short-circuiting the signal line. Another possibility for realizing a defined impedance inside the device is via an "open end" of the signal line, for example. In this manner, the inventive method and/or the inventive measuring device have a calibration device that is contained in the method and/or the device, which enables the method to compensate for thermal drifts using mathematical means, for example.

It is therefore possible, in particular, by performing the calibration measurement at defined impedance 54, to determine constants $\alpha(\omega)$ and $\beta(\omega)$, which are influenced by the electrical network and establish the correlation between electrical shift current I of the capacitive sensor device and measured parameter $M(\omega)$, and to compensate for drifts of measured signal $M(\omega)$ that occur relative to shift current $I(\omega)$ after a reference measurement of this type is carried out.

Substantial drift effects result primarily from temperature changes and aging processes in the components involved. For example, additional time delays $\delta T$ can also occur between the excitation pulse and the interrogation pulse, which would result in distortions in the low-frequency signal. Since an additional time delay of this nature only results in a multiplicative factor in the case of the Fourier-transformed measurement signal $M(\omega)$, a drift of the sampling point in time of this nature may be canceled in the data record relatively easily.

Moreover, the pulse power and spectral shape of the excitation pulse in particular can be subjected to thermal drift. A drift in the frequency characteristic of the high-frequency amplifier may also be compensated for using a reference measurement of this nature.

Figure 3:
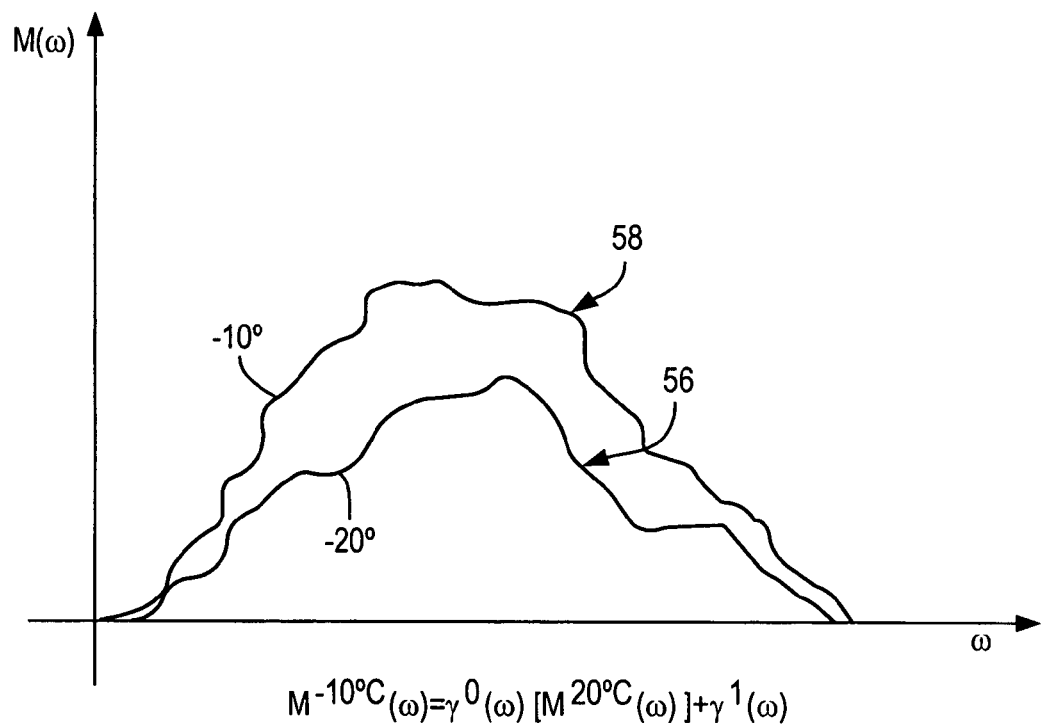
FIG. 3 is a symbolic representation of the temperature dependance of the evaluated measured signal $M(\omega)$.

To compensate for changes in the device, e.g., temperature-induced drifts, a linear correction function for the measured signal is used. FIG. 3 is a schematic representation of the temperature influence on measurement parameter $M(\omega)$. Measurement parameter $M(\omega)$ is subject to strong temperature-dependent change. Curve 56, for instance, shows the frequency-dependent measurement parameter $M(\omega)$ at a temperature of 20° C. Measurement curve 58, which is also shown, depicts signal $M(\omega)$ measured at a temperature of −10° C. The method used to evaluate the measured signal now assumes that there is a linear dependence between the two measurement curves at different temperatures.

To compensate for this temperature effect, two correction factors $\gamma 0(\omega)$ and $\gamma I(\omega)$ [are used to establish] the correlation of measurement parameter $M(\omega)$ measured under calibration conditions (e.g., 20° C.) with measurement parameter $M(\omega)$ obtained in an on-site measurement. That is, the following applies, for example:

$$M^{-10°}(\omega) = \gamma 0(\omega) * (M^{20°}(\omega)) + \gamma I(\omega)$$

For the inventive method, for example, measurement parameter $M(\omega)$ is measured under calibration conditions, i.e., at a defined temperature and reference impedance, which can be realized via air measurement, a calibration stone or a short-circuited sensor.

If a calibration measurement is now carried out on-site under real operating conditions with the same defined impedance, i.e., an air measurement, a measurement of a calibration stone, or a measurement with a short-circuited sensor, correction constants $\gamma 0(\omega)$ and $\gamma I(\omega)$ can now be deduced from measured value $M(\omega)$, which has been changed due to drift effects. The correction factors determined in this manner are stored in a memory unit, so they can be called up for subsequent signal evaluation.

If a calibration having defined impedance is carried out before the actual measurement to locate an enclosed object, correction factors $\gamma 0(\omega)$ and $\gamma I(\omega)$ that are currently obtained in the calibration measurement are also used to correct measurement parameter $M(\omega)$ in the actual measurement procedure.

In this manner, the inventive method is capable of canceling effects in the measured signal that have an adulterating influence on the measurement parameter to be processed. These influences on the measurement parameter of the capacitive sensor device, referred to in general as drift effects, include, in particular, temperature changes, changes in humidity, changes caused by component aging, and changes caused by a variation in the voltage supplied to the measuring device. The exemplary embodiment of an inventive measuring device in the form of a hand-held, battery-operated measuring device can therefore compensate for a drop in battery voltage even over a certain period of time without this variation in voltage having a marked influence on the quality of the measured results.

In addition to the drift effects described, sample strews of individual components also result in different measurement characteristics of each individual measuring device, which can be compensated for using the correction function described. The inventive method therefore enables compensation for drift effects or sample strews by comparing a reference signal stored in the device with a calibration signal recorded at the point in time when the measurement is performed. This comparison measurement allows a linear correction parameter for the measured signal to be determined, which permits the inventive method to back-calculate the values measured currently on-site to reference conditions.

It is advantageous, in particular, to carry out a reference measurement directly after a device is fabricated, e.g., still in the factory, under defined calibration conditions. This measurement can then be adjusted later based on the actual location measurements carried out on-site.

It is also possible to carry out a reference measurement of this type that yields a defined measured signal $M(\omega)$ by using a "master measuring device", and to import the reference values determined for the "master device" in the form of a performance map into further measuring devices immediately after production. In this case, it would also be possible, for example, to compensate for sample strews of the directional pattern of the electric field of the precision capacitor of the individual devices.

Different directional patterns resulting from mechanical and geometric differences in capacitor electrodes and/or corresponding directional electrodes for the electrical measurement field mean there are differences in terms of the detected location of an enclosed object, and they make it difficult to compare the measured data obtained with the various devices.

Figure 4:
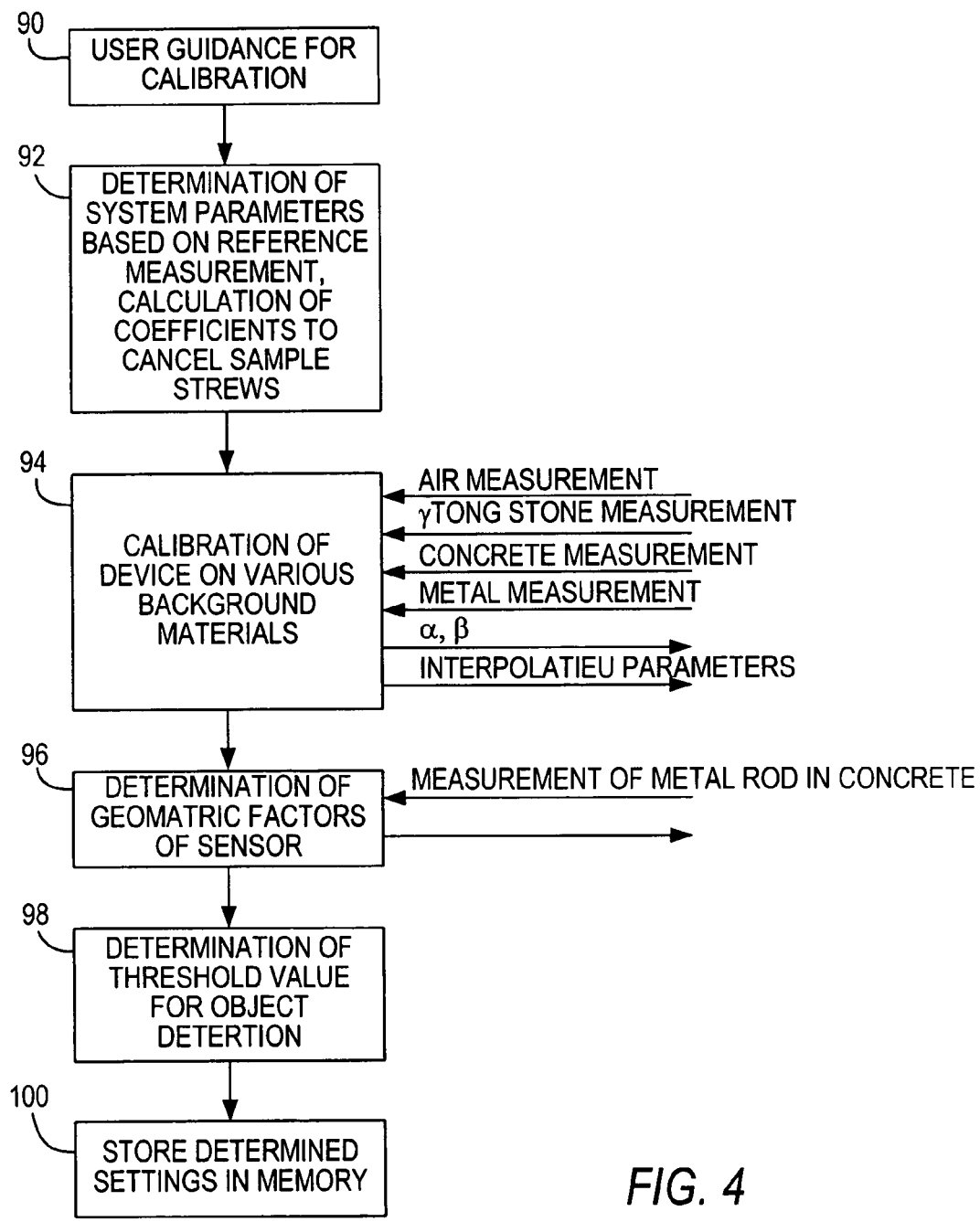
FIG. 4 is a block diagram for depicting method steps for recording reference values.

FIG. 4 uses a block diagram to illustrate the process of measuring reference values, which are measured in the factory directly after the inventive device was produced, for example, and which can be stored in a memory element of the measuring device. In step 90, user guidance is written to a memory element of the inventive measuring device, which is capable of being reproduced on a display of the measuring device as an animated film sequence, and thereby better inform the operator about the method steps to carry out to calibrate the measuring device on-site.

In method step 92, reference measurements are carried out and stored in the device. The reference measurements serve to determine the system parameters specific to the device. To this end, the signal measured at defined impedances is evaluated, and a linear order correction function is created for each individual measuring device. Using this correction function, it is possible to cancel sample strews, e.g., of the mechanical design of the capacitive sensor device, out of the signal measured later on-site.

In method step 92, the measuring device is calibrated against various defined background materials. The values of these reference measurements, e.g., carried out on air, concrete, metal and Ytong stone, and further commonly used building materials, are stored in the device. By referencing the known dielectric constants of these defined materials, constants $\alpha(\omega)$ and $\beta(\omega)$ may be determined; these constants are conditional upon the detection network and represent the relationship between the dielectric shift current of the capacitive sensor device and measured signal $M(\omega)$ used for evaluation purposes. A reference measurement of this type also makes it possible to determine the signal distortions that occur due to phase distortions and the frequency characteristic of signal lines, and/or internal crosstalk between the electrodes of the precision capacitor. In this manner it is possible to very accurately deduce the fundamental dielectric shift current when performing a subsequent determination of the measured signal $M(\omega)$ on-site by using coefficients $\alpha(\omega)$ and $\beta(\omega)$, which are then known.

In method step 92, interpolation parameters are also obtained for the model of the enclosing medium on which the method is based. The inventive method uses a numeric model for the enclosing medium, which utilizes a plurality of material parameters of defined reference materials. By performing a reference optimization between the signal, measured on-site, from the surrounding medium with the parameters of the model stored in the measuring device, it is possible to very exactly determine the dielectric properties of the surrounding medium that was measured. Essentially, an interpolation of the reference parameters on which the model is based is utilized on the value of the enclosing medium that is measured on-site.

In method step 96, a determination of a geometric factor of the capacitive sensor device is carried out. To this end, a reference signal is measured on a defined, spatially very limited reference body that is enclosed in a known medium. Due to mechanical or geometric deviations of the electrodes of the capacitive sensor device, differences can occur in the directional pattern of the precision capacitor, which would result in uncertainty about the exact determination of the location of the enclosed object. In method step 96, correction parameters are therefore determined to take into account the deviations in the directional patterns of individual measuring devices for every individual measuring device, and they are stored in the measuring devices, so that the evaluating algorithm can call up these parameters and take them into consideration.

In method step 98 in FIG. 4, the factory setting of reference values for the inventive method and/or the inventive measuring device determines threshold values for object detection based on the reference measurements that are carried out. Using these threshold values, the processing algorithm determines whether an object has been detected or not. The threshold values are a function of the measurement accuracy of every individual device, and of corresponding sample strews.

Method step 100 in FIG. 4 represents the storage of predetermined settings in a memory element of the inventive measuring device. Using the stored reference values and a calibration measurement to be carried out on-site before the actual measurement, it is possible to largely eliminate interference effects on the measured signal, enabling an extremely accurate measurement sensor to be obtained. It should be emphasized, in particular, that plastic pipes can be detected using this measurement sensor as well, for example. Including a large number of reference values that permit interference effects to be canceled during subsequent evaluation of the signal has a substantial effect on the enhanced performance of the inventive measuring device and/or the inventive method on which it is based.

A central point of the inventive method is to divide measured signal $M(\omega)$ to be evaluated into two parts. Measured signal $M(\omega)$ is divided into a background part $UG(\omega)$, which originates from the enclosing medium, and an "enclosed" part $E(\omega)$, which results from the enclosed object.

The phase and amplitude of the "enclosed" signal and the background signal are known from the measurement of signal variable $M(\omega)$. It must be noted that "enclosed" signal $E(\omega)$, which originates from enclosed dielectric objects, is extremely small. Changes in capacitance, which are determined when an enclosed object is present, typically take place in the sub-picofarad range when enclosed dielectric objects, such as plastic pipes, are present. When an alternating voltage of, e.g., one volt, and having a measuring frequency of 100 KHz, is applied to the capacitive sensor, the small changes therefore result in differences in the shift current of less than one microampere.

For this reason, a measuring frequency in the gigahertz range is utilized with the inventive method in order to generate changes in the measured signal that are sufficiently great, even when the smallest changes in capacitance take place due to the presence of an enclosed object. The background signal is the signal that would be generated if objects were not present. It can be measured directly next to an enclosed object, for example. The present invention takes advantage of the fact that the background signal is dominated by parts of the shift current that are generated by the areas of the electrical measurement field that are close to the surface. From this point forward it is assumed that background signal $UG(\omega)$ is known. Background signal $UG(\omega)$ is composed of shift currents $Iv(\omega)$ along flux lines v of the electric field of the precision capacitor. As shown in FIG. 1, for example, the individual flux lines v are of different lengths. It is therefore possible to define a mean flux line length L, which indicates the phase of the shift current. From this point forward, all phases are indicated in relation to this mean phase. If an enclosed dielectric object is brought into the vicinity of the measuring electrodes of the capacitive sensor device, the current distribution of the shift current changes. In practice, one can assume that this change, which is caused by an enclosed object, is small. The following therefore applies:

$$E(\omega) \ll UG(\omega).$$

It can therefore be approximately assumed that the influence of the dielectric field results in an amplification or attenuation of shift current Iv along individual flux lines v having length Lv. The following therefore applies:

$$Iv(\omega)(\text{in the presence of an enclosed object}) = \xi * Iv(\omega)(\text{background}) * \exp(i * 2\pi/\lambda(\omega) * (Lv-L))$$

In this case, $\xi$ represents a real amplification or attenuation factor. If the dielectric constant $\in$ of the enclosed object is greater than the $\in$ of the surrounding medium, then $\xi > 1$. The capacitance of the precision capacitor is increased, and the shift current is increased. In the opposite case, $\xi < 1$. If the enclosed object is small enough, so that only flux lines having a certain length Lv are affected, then the following approximately applies:

$$E(\omega) =$$

$$lv(\omega)(\text{in the presence of an enclosed object}) - lv(\omega)(\text{background})) =$$

$$(1-\xi)\exp(i*2\pi/\lambda(\omega)*(Lv-L))*lv(\omega)(\text{background})$$

If the type of enclosed object is known, e.g., a metallic enclosed object or an open space, then the sign of (I-ξ) is known.

The following therefore applies:

$$2\pi/\lambda(\omega)*(Lv-L)=-\phi(\omega)+\psi(\omega)$$

That is, the length of the affected flux lines Lv may be deduced based on a comparison of the phase of the signal E(ω) with the phase of the background signal UG(ω), based on the relationship:

$$\lambda(\omega)/2\pi*(-\phi(\omega)+\psi(\omega))+L=Lv$$

The length of the affected flux lines is related to the depth of the object via a geometric factor G(ω,L).

In practice, the device performs averaging over a location interval [x,y] in which largely no enclosed objects are present. The spacial mean of MW_M(ω) therefore provides a usable starting point for the background components. This means that, if the measurement parameter M(Xj,ω) was detected at n locations Xj, then, to determine the background components, all j greater than M(Xj,ω) are summed and normalized with 1/N.

As a possible extension of this fundamental averaging method, it is advantageous to exclude areas with strong signal changes, i.e., large deviations from the mean, from the averaging, or to replace the calculation of the mean with the determination of the median of the measured data obtained over the location.

Instead of performing an averaging of various locations, it is also possible to utilize background signals MUG(ω) stored in a table in the memory. If it is known, for example, that the background is concrete, it is possible to utilize measured values MUGBETon(ω), which result for a homogeneous concrete block, that are stored in the memory as the background signal. The stored background signal to be subtracted can be selected automatically, e.g., by comparing an estimated background signal with various backgrounds stored in a table, or via a switch that the user can operate.

A numerical model is used for the background, the model utilizing at least four material parameters, e.g., the dielectric constants of known materials. The model is based on the reflectance behavior of electromagnetic signals on dielectric boundary layers. To determine the material of the enclosing medium that is measured, the weighting of the parameters in the model of the enclosing medium is varied until a model signal that comes as close to it as possible can be reconstructed by performing a reference optimization in the measured background signal. The dielectric constants of the measured enclosing medium can therefore be deduced based on an interpolation of the parameters of the model medium. When the dielectric constants of the enclosing medium are known, the depth of the enclosed object in the enclosing medium may be deduced from the phase information of the measured signal that originates from the enclosed object.

According to the invention, it is provided with the method described that the threshold for detecting enclosed objects is variable. A sensitivity setting allows, e.g., irrelevant objects, in particular those having a periodic structure, to be canceled out of the measured signal, so they do not appear when the measured results are subsequently displayed on an optical display. The inventive method permits the measuring range to be limited to a desired depth range based on a selected special range of phase displacements of the measured signal. In this manner, the selection of a special, limited depth range may be implemented. The measuring depth displayed in the optical display of the inventive measuring device may be switched between various values (e.g., 6 and 10 cm).

FIG. 5 is an overview of a block diagram to illustrate the individual method steps in the inventive method.

After the device is powered on in step 60, a system query for the measuring device takes place. System query 62 checks the battery status (battery voltage), for example, the internal resistance of the battery, and the current temperature. In step 64, a reference measurement at a defined impedance is carried out. To this end, a reference device inside the device can be utilized, for example, or an air measurement can be carried out. This reference measurement is also carried out to determine EMC interferences, e.g., caused by adjacent transmitting equipment. EMC interferences of this nature may be subsequently canceled in the measured signal with the inventive method.

A wall contact check takes place in step 65 of the inventive method, in which the corresponding displacement transducer of the inventive measuring device performs a query to ensure that the measuring device is placed properly on the wall to be analyzed. As an alternative, the wall contact can also be queried by evaluating the measured signal of the capacitive sensor device. If the measuring device determines that the surrounding medium is air, then the device cannot be placed on the wall.

The actual measuring procedure then takes place in method step 68, in which raw data from the capacitive sensor device is measured and forwarded to the digital signal processor. In method step 70, which represents the start of the evaluation of the measured signal, interference signals from external sources of interference are canceled out of the raw data. In method step 72, a first correction of the measured signal due to sample strews takes place. To accomplish this, the device-specific system parameters determined by a reference measurement performed in the factory, i.e., the corresponding correction coefficients, are taken into account and the measured signal is transformed in a described, linear fashion. Method step 74 describes the correction of drift effects internal to the device, such as temperature and aging influences. To determine a corresponding correction function for measured signal M(ω), a comparison is carried out in method step 74 between a reference measurement of a defined impedance carried out in the factory and stored in the device, and the result of the actual reference measurement according to method step 64. For measured signal M*(ω) that has been processed in this manner, the described separation into signal parts arising from the enclosing medium and signal parts that originate from the enclosed object is now carried out in method step 76. The measured wall material is determined via interpolation with the reference values using the parameters stored in the device for reference materials and a corresponding mathematical model for the composition of the enclosing medium. In particular, a dielectric constant is assigned to the measured wall material and/or the enclosing medium, which is required for the further evaluation of the measured signal.

After the detection signal is separated into signal parts originating from an enclosing medium and/or an enclosed object, a geometric factor for the capacitive sensor device is taken into account in method step 78 to determine the exact location position of the enclosed object. This geometric factor takes into account production-induced geometric deviations in the directional pattern of the capacitive sensor device, for example. These device-specific differences can be taken into account using a linear correction function and canceled out of the actual measured signal. In order to take into account the threshold values for object detection set at the factory, the decision is made via signal processing in method step 80 whether an object has been located or not. If the decision is positive, the size of the object, its length relative to the measuring device, and the depth of the object are then determined via the described evaluation of the magnitude and phase of the measurement parameter $M^*(\omega)$. In particular, the depth of the enclosed object in the wall is determined from the phase of the measurement parameter $M^*(\omega)$ and the dielectric constant of the round material determined in method step 76.

In method step 82, the measured result that is obtained is displayed graphically on the display of the measuring device. To accomplish this, the position of the located object relative to the current position of the measuring device, the object size and the depth of the object are depicted on the display device of the measuring device using symbols in such a manner that the operator is provided with a cross-sectional representation of the analyzed wall.

In particular, it is also possible to display, graphically as well, for example, a permissible drilling depth that is possible without contacting the located object during drilling. The depiction of the measured results on the display of the measuring device takes place in real time, so that the located object is depicted on the display of the inventive measuring device with a minum time delay, even while the measuring device is still being moved across a section of the wall.

The inventive method and the corresponding inventive measuring device are not limited to the exemplary embodiment presented in the description and the drawing.

What is claimed is:

1. A method for locating objects enclosed in a medium, according to which a detection signal is generated by at least one capacitive sensor device, the detection signal penetrating the medium that is to be analyzed in such a way that information is obtained about the objects that are enclosed in the medium by evaluating the detection signal, particularly by measuring impedance, wherein, in order to obtain information about the depth of an object that is enclosed in the medium, a phase measurement of a variable which is correlated with a shift current of the capacitive sensor device is utilized.

2. The method as recited in claim 1, wherein a linear correlation between the measurement parameter and the shift current of the capacitive sensor device is utilized.

3. The method as recited in claim 1, wherein an electrical voltage signal is measured to evaluate the detection signal in terms of magnitude and phase.

4. The method as recited in claim 1, wherein a phase shift of the capacitive sensor shift current generated by an enclosed object is utilized to detect the object.

5. The method as recited in the claim 1, wherein the detection signal is composed of more than one measuring frequency.

6. The method as recited in claim 5, wherein one or more measuring frequencies of the detection signal are used in an interval of 100 MHz to 10000 MHz, preferably in an interval of 500 MHz to 5000 MHz, and, optimally, in an interval of 1000 MHz to 3000 MHz.

7. The method as recited in claim 1, wherein the detection signal for locating an object enclosed in a medium is measured and evaluated as a function of a lateral movement of a capacitive sensor device that is generating the detection signal.

8. A measuring device, in particular a hand-held locating device for locating objects enclosed in a medium, having a sensor device, with means for generating a detection signal for the sensor device, a control and evaluation unit for determining measured values from the detection signal, and an output device for the determined measuring devices, for carrying out a method according to claim 1.

9. The measuring device as recited in claim 8, wherein the measuring device includes means that permit measured results, in particular the location and/or the location and depth of an object enclosed in a medium, to be depicted in a spatially resolved manner on a display device of the measuring device.

10. The measuring device as recited in claim 8, wherein the measuring device has path sensor means which provide a correlated depiction of the object depth and of the lateral position of the object.

* * * * *